Aug. 18, 1964  E. R. PRICE  3,144,920
HYDRAULIC BRAKING SYSTEM HAVING IMPROVED STABILITY
Filed Jan. 15, 1962
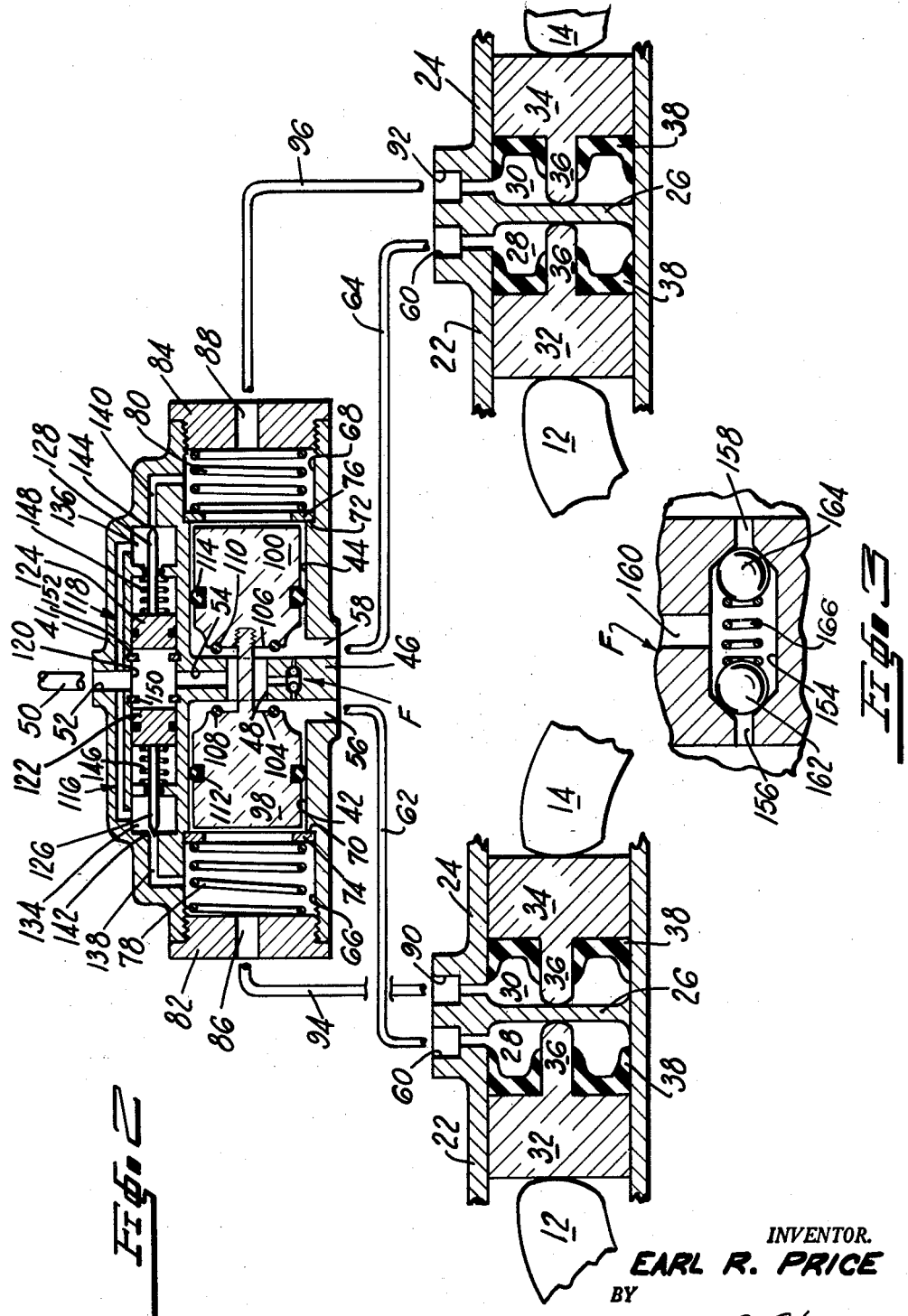
INVENTOR.
EARL R. PRICE
BY
William P. Hickey
ATTORNEY

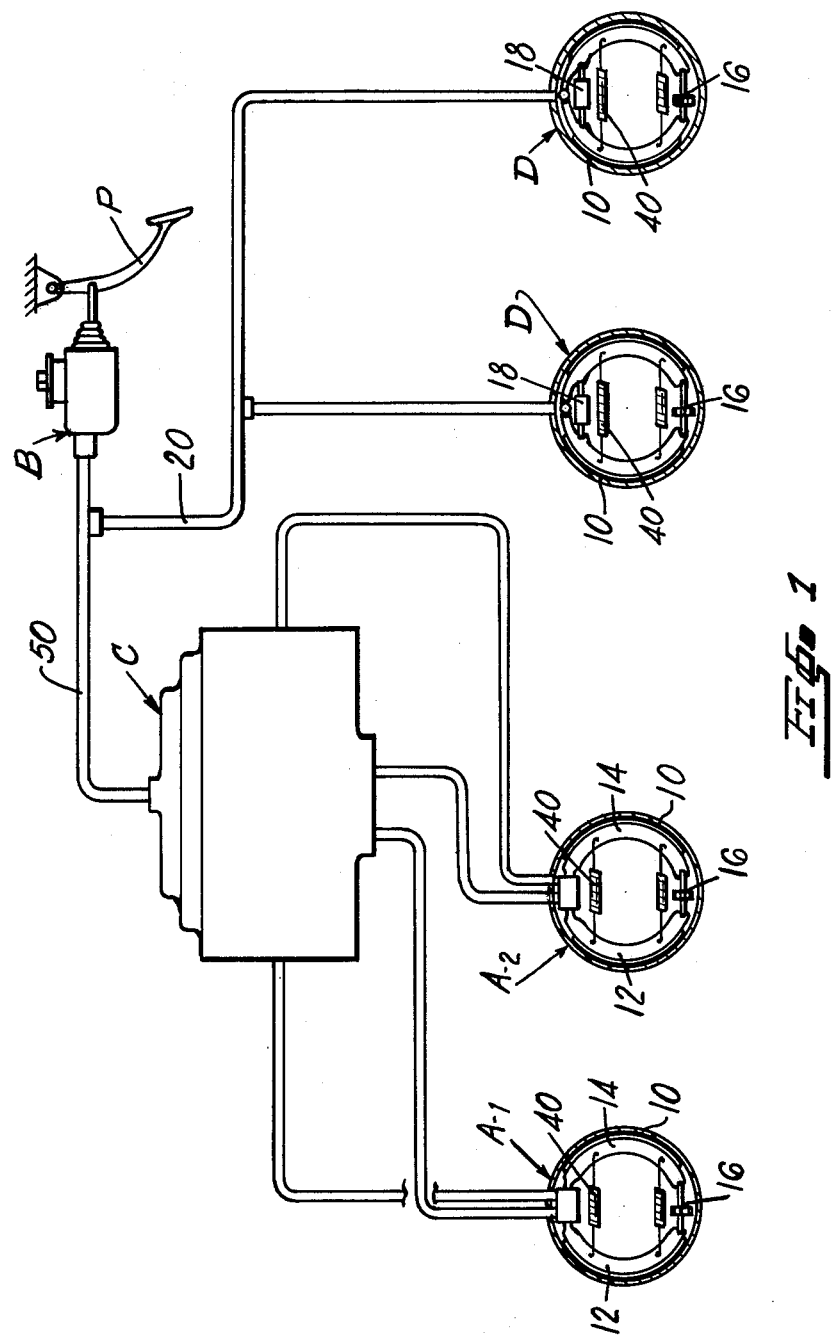

United States Patent Office 3,144,920
Patented Aug. 18, 1964

3,144,920
HYDRAULIC BRAKING SYSTEM HAVING IMPROVED STABILITY
Earl R. Price, South Bend, Ind., assignor to The Bendix Corporation, South Bend, Ind., a corporation of Delaware
Filed Jan. 15, 1962, Ser. No. 166,345
4 Claims. (Cl. 188—152)

The present invention relates to hydraulic braking systems of automotive vehicles; and more particularly to hydraulic braking systems of the type having wheel brake structures on opposite sides of the vehicle, each brake structure of which has a primary friction producing element whose engagement with a revolving structure transmits a brake applying force to its secondary friction producting element.

In one type of braking structure which is extensively used today, the rotating element of the brake structure is engaged by a pair of friction elements which are so arranged that the frictional engagement of the primary friction element with its rotating member produces a torque which in turn forces its secondary friction producing member against the rotating surface. While this principle can be designed into various designs of brake structures, the most common structure is of the drum and shoe type, wherein the leading edge of a primary shoe is forced into engagement with the brake drum to produce a torque that is transmitted from the trailing edge of the primary shoe to the leading edge of the secondary shoe, to in turn apply the secondary shoe against the rotating drum. The configuration of the primary and secondary shoes is usually such that frictional engagement of the shoes with the drum produces a component which helps to force the shoe still further in engagement with the drum so that the total brake structure can be actuated by means of a force which is considerably less than that required to actuate other known types of brake structures. The primary and secondary shoes are usually lined with an organic friction material that comprises fillers held together by an organic resin. These linings usually have quite high coefficients of friction, but suffer from the defect that their coefficient of friction changes quite readily with heat and atmospheric conditions. When such linings are used in the self-energizing type of brake structure previously described, a considerable difference can occur between the retarding force of a brake structure on one side of the vehicle from that on the other side of the vehicle, with the result that a swaying of the vehicle occurs—particularly where this difference in braking effort occurs on the front wheels of the automotive vehicle.

An object of the present invention is the provision of a new and improved hydraulic braking system of the above mentioned type wherein means are provided for increasing the stability of the braking system.

A further object of the present invention is the provision of new and improved means for sensing the unbalance in braking torque which is produced between brakes on opposite sides of the vehicle, and for using this unbalance to operate suitable mechanism which adjusts the actuating force which is applied to the brake structures on opposite sides of the vehicle.

A more detailed object of the present invention is the provision of a new and improved braking system of the above described type wherein: the primary and secondary friction elements in brakes on opposite sides of the vehicle are operated by separate fluid pressure motors, and wherein suitable valving is employed to close off communication from the master cylinder to the motors actuating the secondary friction elements after they have been applied—the system using the difference in pressure which occurs in the secondary motors to decrease the actuation of the brake structure producing the greatest braking effort.

A still more detailed object of the present invention is the provision of a new and improved braking system of the immediately above described type wherein the pressure in the secondary fluid pressure motors is allowed to equalize.

Another object of the present invention is the provision of a new and improved braking system of the above mentioned type wherein the unbalance in pressure in the secondary fluid pressure motors is used to close off communication between the master cylinder and the primary fluid pressure motor of the brake producing the greatest retarding torque.

The invention resides in certain constructions and combinations and arrangements of parts; and further objects and advantages of the invention will become apparent to those skilled in the art to which it relates from the following description of the preferred embodiment described with reference to the accompanying drawings forming a part of this specification and in which:

FIGURE 1 is a schematic view of an automotive hydraulic braking system embodying principles of the present invention;

FIGURE 2 is a fragmentary schematic view showing portions of the system seen in FIGURE 1 in cross section; and FIGURE 3 is a fragmentary cross section view of a check valve structure shown in FIGURE 2.

The braking system shown in FIGURE 1 generally comprises: a pair of identically constructed brake structures A designed in accordance with principles of the present invention, and individual ones of which are positioned on opposite sides of the vehicle; a master cylinder of conventional construction B; and a force or pressure distributing mechanism C which adjusts the brake applying force in the brake structures $A_1$ and $A_2$ to offset any momentary variations in the coefficient of friction in the brake structures $A_1$ and $A_2$. Where the vehicle is equipped with four wheel brakes, the remaining two wheels may be similarly equipped with a pair of brake structures $A_1$, $A_2$ and another brake adjusting mechanism C that in turn is supplied with pressure from the master cylinder B. In as much as a greater amount of vehicle sway is produced by inequality in the action of the front wheel brakes of the vehicle than is produced by inequality in action of the rear wheel brakes of the vehicle, it will only be necessary in most instances to equalize the brake application of the front wheel brakes. Where only the front wheel brakes are to be equalized, the rear wheel brakes may be of conventional construction and may be operated directly from the master cylinder B in the usual manner.

The rear wheel brakes D, shown in the drawing, are of conventional construction, for example that shown in the Du Buc et al. application Serial No. 101,408 filed April 7, 1961. As such, the brake structures D comprise a drum 10 which is rotated by the wheel of the vehicle and a pair of brake shoes 12 and 14—the brake shoe 12 of which may be thought of as the leading or primary brake shoe, and the brake shoe 14 of which may be thought of as the trailing or secondary brake shoe. The bottom ends of the brake shoes 12 and 14 are interconnected by means of an adjustable link 16, and the top ends of the brake shoes 12 and 14 are adapted to be spread apart into engagement with the brake drum 10 by means of a hydraulic wheel cylinder 18. The wheel cylinder 18 has a pair of opposing hydraulic pistons therein, not shown, which are spread apart by hydraulic pressure to cause each of the brake shoes 12 and 14 to move outwardly into engagement with the brake drum 10.

When the brake drum is revolving counterclockwise as will occur during forward motion of the vehicle, pressure in the wheel cylinder 18 causes the leading edge of the primary brake shoe 12 to move into engagement with the brake drum 10; whereupon a torque is produced which transmits a force from the trailing edge of the primary brake shoe 12 to the leading edge of the brake shoe 14, to thereby cause the secondary shoe 14 to produce a drag upon the brake drum 10. Engagement of the secondary brake shoe 14 with the brake drum 10 causes a further torque to be produced upon the secondary brake shoe 14 which causes it to move up into engagement with the stationary wheel cylinder 18, and thereby resist further movement of the brake shoes 12 and 14. The construction of the brake shoes 12 and 14 is such that engagement of the shoes with the drum 10 produces a component which in turn helps force the shoes further into engagement with the brake drum so that the shoes can be actuated with considerably less hydraulic pressure in the wheel cylinders 18 than is possible with other non-servo acting types of brake mechanisms. The wheel cylinders 18 are of course identical in construction, and are supplied with hydraulic pressure from the master cylinder B through the branch hydraulic lines 20.

The braking structures $A_1$ and $A_2$ are of course identically constructed in a manner similar to that of the conventional brake structures D excepting that their primary and secondary brake shoes 12 and 14 are actuated by separate primary and secondary fluid pressure motors that are so arranged that the pressure in the secondary fluid pressure motor can differ from that in the primary fluid pressure motor 22. Pressure is supplied to each of the primary and secondary fluid pressure motors 22 and 24, respectively, from the master cylinder B through the brake adjusting mechanism C in a manner which equalizes the amount of braking torque produced at each of the left and right front wheels. The fixed partition wall 26 separates the fluid pressure chambers 28 and 30 of the primary and secondary motors 22 and 24, respectively; and the outer end of each of the chambers 28 and 30 are closed off by means of identical pistons 32 and 34 having a center projection 36 adapted to abut the partition 26. An annular cup seal 38 is provided for each piston between the projection 36 and the sidewalls of the respective chambers to provide a fluid tight sliding seal with respect to the sidewalls of the chambers. The primary piston 32 abuts and drives the leading edge of the primary shoe 12 into engagement with the brake drum 10 and the secondary piston 34 abuts and drives the trailing edge of the secondary shoe 14 into engagement with the brake drum 10. Suitable spring means 40 are provided for normally pulling the upper ends of the brake shoes 12 and 14 together to hold the pistons 32 and 34 into engagement with the fixed partition wall 36.

The brake adjusting mechanism C for controlling the application of the left and right front brakes generally comprises a casting 41 having aligned piston chambers 42 and 44 that are generally separated by means of a fixed partition wall 46. The fixed partition wall 46 has a central opening 48 therethrough, and pressure from the master cylinder B is communicated through line 50 to the pressure inlet 52 that is formed by a lateral drilling 54 which extends through the partition 46 to the central opening 48. By means of this expediency, pressure from the master cylinder flows into the central opening 48, and thence to each of the piston chambers 42 and 44 from whence it flows through pressure outlets 56 and 58 to the primary fluid pressure chambers 28 of the respective left and right front brake structures. Each of the primary fluid pressure motors 22 have the usual tapped pressure inlet connection 60 to which the pressure outlets 56 and 58 of the brake adjusting mechanism C are respectively connected through distribution lines 62 and 64.

The outer ends of each of the piston chambers 42 and 44 are counterbored as at 66 and 68 to provide respective shoulders 70 and 72 against which annular abutment washers 74 and 76 are normally held by the respective coil springs 78 and 80. The outer end of the counterbores 66 and 68 are threaded to receive suitable end closure members 82 and 84 which hold the respective coil springs 78 and 80 in position. The end closure members 82 and 84 are provided with respective outlets 86 and 88 which are communicated to the respective pressure inlets 90 and 92 of the secondary motors 24 through interconnecting lines 94 and 96. Piston members 98 and 100 are provided in the respective piston chambers 42 and 44; and the pistons 98 and 100 are suitably interconnected through the central opening 48 by means of a threaded projection on one of the pistons which is tightened into a threaded opening in the other of the pistons. The inner end surfaces 104 and 106 of the pistons 98 and 100 are provided with suitable seals 108 and 110 for closing off opposite ends of the central opening 48 through the partition 46; and the end surfaces 104 and 106 are spaced apart a greater distance than the thickness of the partition 46 so that in the normal position shown in the drawing, fluid can flow from the pressure inlet 50 to both of the outlets 56 and 58. The outer surface of each of the pistons 98 and 100 are provided with a suitable seal 112 and 114, respectively, for preventing flow past the pistons. The pistons 98 and 100 are so proportioned that, with the pistons centered with respect to the partition 46, the opposite ends of the pistons will have but a slight amount of clearance with respect to the abutment washers 74 and 76 so that movement of the end surfaces 104 and 106 in sealing engagement with the partition member will move the abutment washers 76 and 74 respectively out of engagement with their shoulders 72 and 70.

The brake adjusting mechanism C shown in the drawing is completed by passage means which communicates the pressure inlet 52 to each of the pressure outlet connections 68 and 88 during the initial stages of brake actuation, so as to move the secondary shoes 14 into engagement with the brake drum. At about the time that the secondary pistons 34 have been moved sufficiently to bring the secondary shoes into engagement with the brake drum, communication from the master cylinder to the secondary motor chambers 30 is valved off so that engagement of the secondary shoes 14 with the brake drum produce pressures in the respective secondary fluid pressure chambers 30 which are indicative of the amount of torque being produced by the brake. Any suitable means may be provided for valving off the secondary fluid pressure chambers 30 at about the time that they engage the brake drum; and in the embodiment shown in the drawing, separate flow paths 116 and 118 communicate the pressure inlet 52 with the outlets 86 and 88 respectively.

The flow paths 116 and 118 are shown somewhat schematically in the drawing for simplicity sake. As shown in the drawing, a large diameter chamber 120 intersects the transverse bore 54 between the pressure inlet 52 and the opening 48; and a pair of pistons 122 and 124 are positioned in the chamber 120 so as to be exposed to the pressure from the master cylinder. The pistons 122 and 124 are provided with suitable needle shaped projections 126 and 128 which extend through the opposite end walls of the chamber 120 to act as a valve closure member for the passages 116 and 118 respectively. Suitable seals are provided on the pistons 122 and 124 to prevent fluid flow therepast; and suitable seals are also provided in the end walls of the chamber 120 for effecting a seal with respect to the needles 126 and 128. The flow passages 116 and 118 include enlarged valve chambers 134 and 136 respectively into which the projections 126 and 128 extend. Flow out of the valve chambers 134 and 136 passes through outlet ports 138 and 140 which are aligned with respect to the projections 126 and 128; and flow through the outlets 138 and 140 is controlled by valve seats 142 and 144 which face the projections 126 and 128 and are engaged thereby.

The needle shaped projections 126 and 128 are normally held out of engagement with the valve seats 142 and 144 by means of coil springs 146 and 148, which hold the pistons 122 and 124 into engagement with snap rings 150 and 152 until a predetermined hydraulic pressure is produced by the master cylinder B—at which time the secondary shoes will have been moved out into approximate engagement with their brake drums. This pressure may vary depending upon the strength of the shoe return springs 40, which in one suitable commercial type of brake will occur at approxmiately a pressure of 70 p.s.i. Thereafter the pressure from the master cylinder overcomes the coil springs 146 and 148 to move the projections 126 and 128 against the valve seats 142 and 144, and thereby isolate fluid within the secondary fluid pressure motor chambers 30.

In the normal brake released condition of the embodiment shown in the drawing, the primary and secondary pistons 32 and 34 will engage the partitions 26 and the pistons 98 and 100 will be centered to permit flow from the master cylinder to both primary cylinder chambers 28. The pistons 122 and 124 will be in engagement with their stops 150 and 152 to permit communication from the master cylinder B through the opened valve ports 138 and 140 to both secondary fluid pressure motor chambers 30. The depressing of the brake pedal lever P therefore causes fluid to flow into all of the primary and secondary motor chambers 28 and 30 to force their pistons 32 and 34 into approximate engagement with their brake drums 10. Simultaneously therewith fluid pressure is communicated to the wheel cylinders 18 of the rear wheel brakes to overcome their shoe return springs, and move their primary and secondary brake shoes 12 and 14, respectively, into engagement with their brake drums 10. As the shoe return springs 40 are expanded, more and more pressure is required to be produced in the master cylinder, and at a pressure of approximately 70 p.s.i. the primary and secondary brake shoes 12 and 14 of the front wheel brakes will have been moved out to where they just engage their brake drums 10, but do not produce any appreciable retarding torque. At a pressure of 70 p.s.i. sufficient pressure exists on the pistons 122 and 124 to overcome the springs 146 and 148 and thereby move their projections 126 and 128 into engagement with the valve seats 142 and 144. This of course closes off communication between the master cylinder B and the secondary fluid pressure motor chambers 30 to trap or isolate the fluid therein.

Further depression of the foot pedal lever P causes an increase in pressure in both of the primary fluid pressure motor chambers 28 to force the primary brake shoes 12 of the front wheel brakes against their drums 10 with sufficient force to produce a braking torque. This torque rotates the primary brake shoes 12 counterclockwise as seen in FIGURE 1, to force the secondary brake shoes 14 into friction producing engagement with the brake drum 10. The secondary shoes 14 are designed to have some self-energization, or servoaction which forces the secondary pistons 34 inwardly to increase the pressure within the secondary fluid pressure motor chambers 30. It will readily be seen that any unequalness in braking torque that is produced by the secondary shoes of the left and right front wheel brakes will produce unequal forces on the pistons 98 and 100 and hence unequal pressures in the left and right secondary fluid pressure chambers 30. Where, for example, a greater force is produced by the left wheel brake than is produced by the right wheel brake, a greater pressure would be exerted in the counterbore 66 than is exerted in the counterbore 68 which causes the piston 98 to move inwardly to expand the volume of fluid in the counterbore 66, while at the same time causing the piston 100 to move outwardly to decrease the volume of fluid in the counterbore 68. The expansion of the volume of the chamber 66 allows the secondary piston 34 of the left wheel brake to move inwardly to thereby reduce the amount of braking torque that is produced by the left front brake; and the outward movement of the right hand secondary piston 34 forces its secondary shoe 14 in firmer engagement with its brake drum 10 to increase the braking torque produced by the right front wheel brake. Where the initial movement of the pistons 98 and 100 does not correct the unbalance braking torque that exists in the left and right front brakes, the piston 98 for example, will continue its movement to force its end surface 104 against the partition 46 and thereby close off further communication from the master cylinder B with the primary fluid pressure chamber 28 of the left front brake. A further application of the brake pedal P will increase the pressure in the right hand primary fluid pressure motor chamber 28 to increase the brake application of the right wheel brake until such time as the amount of torque produced by both the left and front wheel brakes are equal.

If the braking torque of the left and right brakes should again become equal, the pressure within the secondary fluid pressure motor chambers 30 in both the left and front wheel brakes will again be equal, and the balancing pistons 98 and 100 will start to move towards their center positions. A slight movement of the face 104 of the piston 98 out of engagement with the partition member 46 will allow a slight increase in pressure to be delivered to the primary chamber 28 of the left front brake—which of course will produce a slight build-up in pressure in its secondary chamber 30 to again force the face 104 into tight engagement with the partition member 46 and produce a throttling action that limits the pressure from the master cylinder that is delivered to the primary chamber 28 of the left front brake. It will be understood that the same type of operation will occur where the greater torque is produced by the right front brake—excepting that in this instance the piston 100 will produce the throttling action.

When it is desired to reduce the braking application, a retraction of the foot pedal lever P will decrease the pressure within the master cylinder B to permit return flow from the primary motor chambers 28, and thereby reduce the amount of braking produced.

During a prolonged brake application, the coefficient of friction in the left and right front brake structures $A_1$ and $A_2$ will usually become equal; and the pistons 98 and 100 will usually become centered. If, however, one of the pistons should still be in abutment with the partition 48 to isolate one of the primary chambers 28 from the master cylinder, return flow out of the isolated primary chamber will occur through the check valve structure F. The check valve structure F, shown, comprises a horizontal chamber 154 in the partition 48. The opposite end walls of the chamber 154 form valve seats that surround inlet ports 156 and 158 respectively which communicate with the chambers 42 and 44 respectively. The center of the chamber 154 has an outlet port 160 which communicates with the opening 48; and a pair of ball valves 162 and 164 are provided for engagement with the seats surrounding the inlet ports 156 and 158 respectively. A spring 166 between the balls 162 and 164 prevents flow from the master cylinder B through the ports 156 and 158; but a release in pressure from the primary motor chambers 28 is permitted whenever the pressure in the master cylinder drops below that in the primary motor chambers 28.

When the primary shoes 12 move out of engagement with the brake drum, the amount of torque produced by the secondary shoes 14 will have decreased to the point where the pressure in the secondary motor chambers 20 has decreased to 70 p.s.i.; whereupon the pistons 122 and 124 open the valve ports 138 and 140 to remove all pressure from the secondary chambers 30. It will be understood that the primary and secondary shoes 12 and 14 of the rear wheel brakes D move simultaneously at all times in the usual manner.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. In an automotive braking system having left and right wheel braking structures each of which include primary and secondary shoes, a rotating drum structure engaged by the shoes, primary and secondary fluid pressure motors respective ones of which force the leading edge of the primary shoe and the trailing edge of said secondary shoe into engagement with said drum structure, and a link transferring servoaction torque forces from said primary shoe to the leading end of said secondary shoe: control means operatively connected to said primary and secondary fluid pressure motors for developing a modulated pressure; valve means operatively connected between said control means and said fluid pressure motors for initially supplying fluid from said control means to each of said fluid pressure motors, and to thereafter isolate fluid in said secondary fluid pressure motors from said control means; balancing means in fluid communication with said control means and said fluid pressure motors, said balancing means having opposing fluid displacement chambers to which pressure from said isolated secondary fluid pressure motors are respectively communicated; opposing movable walls in said respective fluid displacement chambers; and valve means controlled by movement of said opposing movable walls for closing off communication from said control means to the primary fluid pressure motor of the brake structure having the greatest pressure in its secondary fluid pressure motor.

2. In an automative braking system having at least two wheel braking structures each of which include primary and secondary friction elements, a rotating structure engaged by said friction elements, primary and secondary fluid pressure motors respective ones of which force respective primary and secondary friction elements into engagement with said rotating structure, and means transferring servoacting torque forces from said primary element to said secondary element:

control means operatively connected to said primary and secondary fluid pressure motors for developing a modulated pressure;
secondary valve means responsive to pressure in said control means for permitting pressure supply to said secondary fluid pressure motors up to a predetermined level whereafter said secondary valve means closes to isolate fluid in said secondary fluid pressure motors; and
interconnected primary valve means for controlling said primary fluid pressure motors, said interconnected primary valve means being responsive to the isolated fluid pressure in each of said secondary fluid pressure motors to restrict an increase in pressure to the primary fluid pressure motor of the wheel brake structure having the greatest fluid pressure in its isolated secondary fluid pressure motor.

3. In an automotive braking system having left and right wheel braking structures each of which include primary and secondary friction elements, a rotating structure engaged by said friction elements, primary and secondary fluid pressure motors respective ones of which force respective primary and secondary friction elements into engagement with said rotating structure, means transferring servoacting torque forces from said primary element to said secondary element:

control means operatively connected to said primary and secondary fluid pressure motors for developing a modulated pressure;
secondary valve means responsive to pressure in said control means for permitting pressure supply to said secondary fluid pressure motors up to a predetermined level whereafter said secondary valve closes to isolate fluid in said secondary fluid pressure motors; and
interconnected primary valve means for controlling said primary fluid pressure motors, said interconnected primary valve means being responsive to the isolated fluid pressure in each of said secondary fluid pressure motors whereby an unbalance in pressure in said isolated secondary fluid pressure motors that is generated by said servoaction will cause increasing pressure in the secondary fluid pressure motor having the lowest pressure therein.

4. In an automotive braking system having left and right wheel braking structures each of which include primary and secondary friction elements, a rotating structure engaged by said friction elements, primary and secondary fluid pressure motors respective ones of which force respective primary and secondary friction elements into engagement with said rotating structure, means transferring servoacting torque forces from said primary element to said secondary element:

control means operatively connected to said primary and secondary fluid pressure motors for developing a modulated pressure;
secondary valve means responsive to pressure in said control means for permitting pressure supply to said secondary fluid pressure motors up to a predetermined level whereafter said secondary valve closes to isolate fluid in said secondary fluid pressure motors; and
interconnected primary valve means for controlling said primary fluid pressure motors, said interconnected primary valve means being responsive to the isolated fluid pressure in each of said secondary fluid pressure motors whereby the pressure of said isolated secondary fluid pressure motors that is generated by said servoaction decreases the pressure in the secondary fluid pressure motor having the greatest pressure therein.

References Cited in the file of this patent
UNITED STATES PATENTS
3,033,324     Lepelletier _____ May 8, 1962